3,328,240
DISINFECTANTS AND PRESERVATIVES
Wilfried Paulus, Otto Pauli, and Hermann Genth, Krefeld, Germany, assignors to Farbenfabriken Bayer Aktiengesellschaft, Leverkusen, Germany, a corporation of Germany
No Drawing. Filed July 20, 1965, Ser. No. 473,527
Claims priority, application Germany, July 24, 1964, F 43,552
4 Claims. (Cl. 167—22)

The present invention relates to disinfectants and preservatives; more particularly it concerns a process wherein N-methylol compounds of halogenated carboxylic acid amides containing 2 to 6 carbon atoms are utilized as disinfectants or preservatives in aqueous dispersions or emulsions of organic substances.

Suitable N-methylol compounds are, for example, the N-methylol compounds of 2-chloroacetamide, 2,2-dichloroacetamide, 2,2,2-trichloroacetamide, 2-chloropropionamide, 2,2,3-trichloropropionamide, and 2-chlorobutyric acid amide. These N-methylol compounds are either known compounds or easily obtainable from the said halogenated carboxylic acid amides by the action of formaldehyde in a manner known as such.

The disinfectants and preservatives of the invention destroy or inhibit the germination of very diverse bacteria, e.g. Bact. fluorescens, Bact. *Proteus vulgare*, Bact. pyocyaneum, Bact. subtilis and Bact. coli, as well as mould fungi, such as *Penicillium glaucum*, *Rhizopus nigricans* and *Aspergillus niger* in aqueous dispersions or emulsions of a great varieyt of organic substances, for instance waxes, oils or dextrin as well as disperse dyes containing a pigment and a binder such as polyvinyl acetate, polyvinyl chloride and/or polyacrylate.

The necessary amounts of the N-methylol compounds of halogenated carboxylic acid amides containing 2 to 6 carbon atoms can easily be determined by preliminary experiments. In general an amount of 0.05 to 0.2 parts by weight referred to 100 parts of weight of the organic substance present in the aqueous dispersion or emulsion to be disinfected or preserved will be sufficient.

It may be emphasized that the N-methylol compounds to be used according to the invention do not reduce the stability of aqueous dispersions or emulsions.

It is further noteworthy that in aqueous dispersions or emulsions they do not tend to leave the aqueous phase to be protected, and to accumulate in the organic phase. They are superior in this respect to disinfectants and preservatives based on phenol compounds which accumulate in the organic phase, due to their lipophilic nature, so that the growth of organisms living in the aqueous phase is not sufficiently inhibited unless the phenol compounds are used in concentrations which are far higher than those required when the N-methylol compounds according to the invention are used.

The following examples serve to illustrate the invention without, however, limiting its scope.

EXAMPLE 1

A conventional aqueous mineral oil emulsion used for rotating and cutting tools is mixed with 0.15% N-methylol-2-chloroacetamide. The cutting oil emulsion then remains stable for more than 16 weeks without any inconvenient odour occurring whereas a cutting oil emulsion without the addition of N-methylol-2-chloroacetamide exhibits phenomena of decomposition within 2 weeks.

EXAMPLE 2

Commercial aqueous compositions containing disperse dyes and polyvinyl acetate, polyvinyl chloride or a polyacrylate as binder, are mixed with 0.1% N-methylol-2-chloroacetamide, referred to the total weight of the dyes; they then have an excellent storage stability. It may be mentioned that also the aqueous phase is completely germ-free and that germs, for example, of *Aspergillus niger* or *Bacterium pyocyaneum* which have subsequently been introduced into the aqueous phase, are destroyed.

EXAMPLE 3

Commercial aqueous emulsions of ozokerite which are very easily attacked by microorganisms, are mixed with 0.03% N-methylol-2-chloroacetamide; they are then excellently preserved.

The outstanding effect of the disinfectants and preservatives according to the invention may be illustrated by the following experiment: of two adhesive aqueous pastes made from commercial white dextrin, one paste is mixed with 0.1% N-methylol-2,2,3-trichloropropionamide, the other remains untreated. Both pastes are subsequently infected with *Aspergillus niger* and *Rhizopus nigricans* and store at 28° C. for 10 days. After this period of time the paste mixed with N-methylol-2,2,3-trichloropropionamide exhibits no mould growth, whereas the paste not treated with N-methylol-2,2,3-trichloropropionamide exhibits a strong mould growth.

We claim:
1. In the process of disinfecting and preserving aqueous dispersions and emulsions against microorganisms which comprises the step of incorporating therein an effective amount of N-methylol halogenated carboxylic amide containing 2–6 carbon atoms as the active antimicrobial agent.
2. A stabilized composition consisting essentially of an aqueous dispersion of an organic substance selected from the group consisting of waxes, oils, dextrin, and aqueous dispersed dye compositions containing a dispersed dye and binder and a stabilizer selected from the group consisting of the N-methylol of 2,2-dichloroacetamide, 2,2,2-trichloroacetamide, 2-chloropropionamide, 2,2,3-trichloropropionamide, 2-chlorobutyric acid amide, and 2-chloroacetamide.
3. In the process of claim 1 wherein the antimicrobial agent is a member selected from the group consisting of N-methylol of 2,2-dichloro-acetamide, 2,2,2-trichloroacetamide, 2 - chloropropionamide, 2,2,3 - trichloropropionamide, 2-chlorobutyric acid amide, and 2-chloroacetamide.
4. The process of claim 1 wherein antimicrobial agent is utilized at a concentration of .05–.2 parts by weight, referred to 100 parts by weight of dispersed substance susceptible to bacterial and fungal attack.

References Cited
UNITED STATES PATENTS
2,938,815   5/1960   Van Bochove _____ 167—38.5

OTHER REFERENCES
Van Bochove, Chem. Abstracts 54 (1960) p. 20236h.

ALBERT T. MEYERS, *Primary Examiner.*
JULIAN S. LEVITT, *Examiner.*
STANLEY J. FRIEDMAN, *Assistant Examiner.*